Oct. 30, 1956  E. H. HERMANSON  2,768,628
VINER
Filed Nov. 22, 1954  4 Sheets-Sheet 2
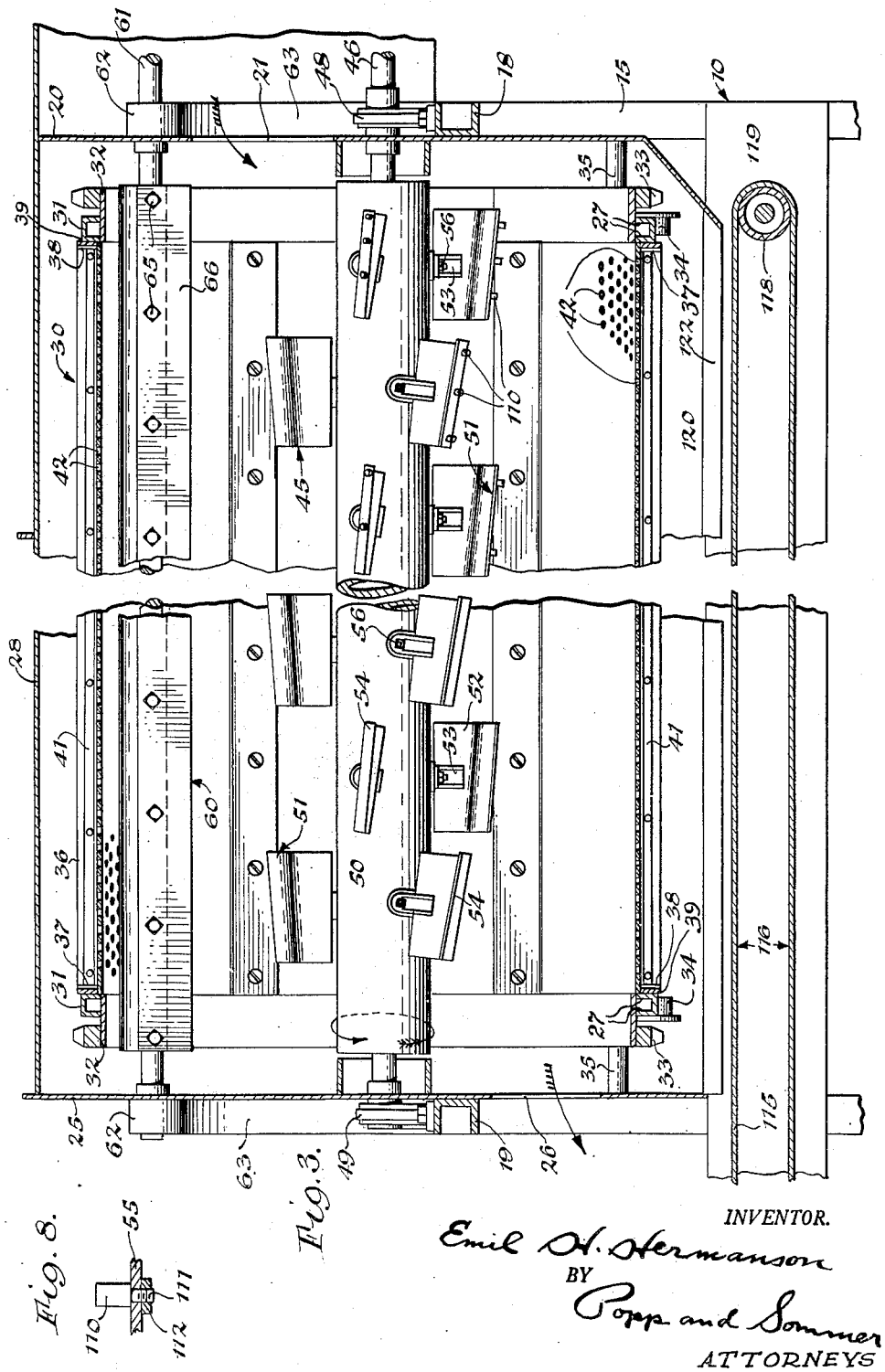
INVENTOR.
Emil H. Hermanson
BY
Popp and Sommer
ATTORNEYS

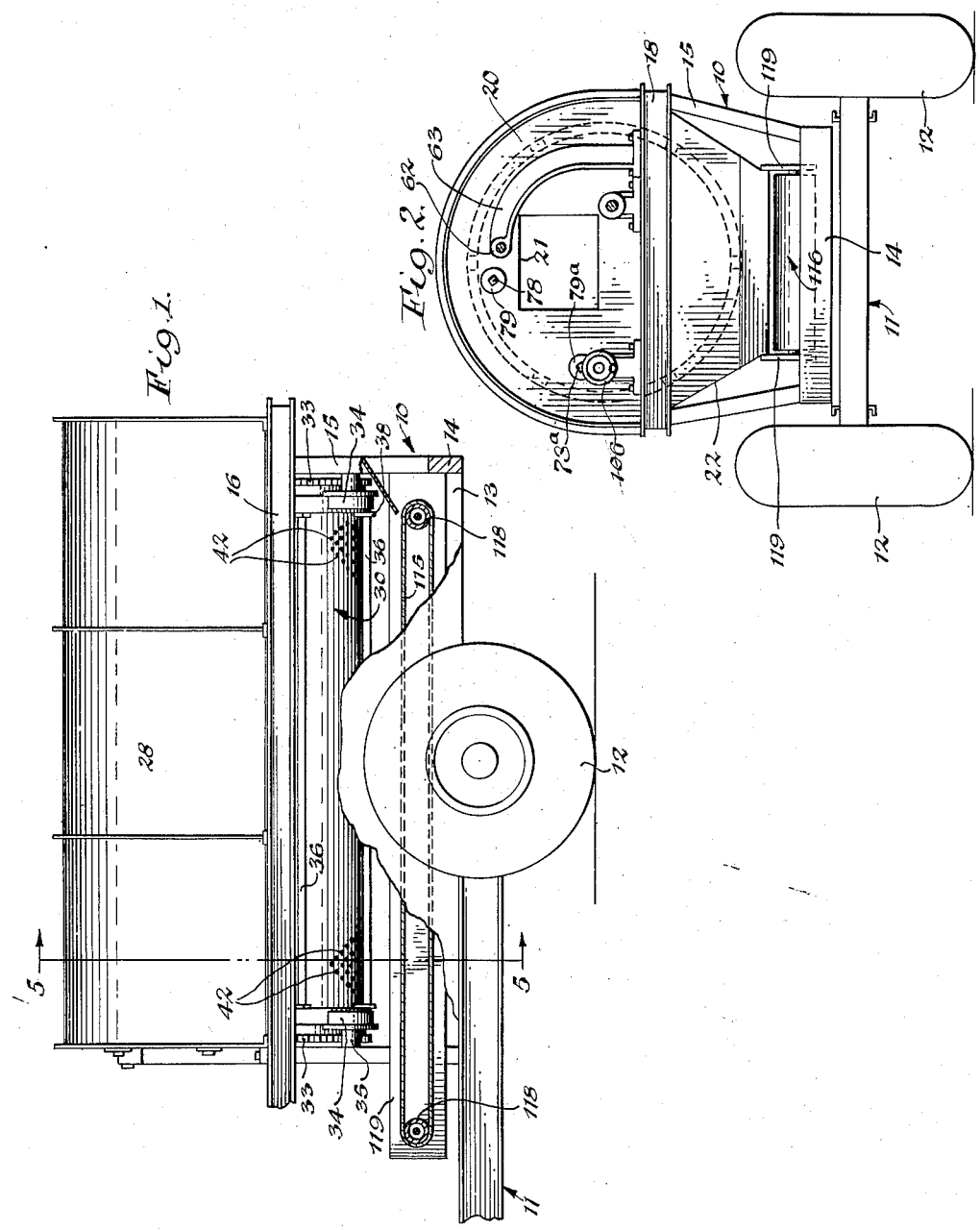

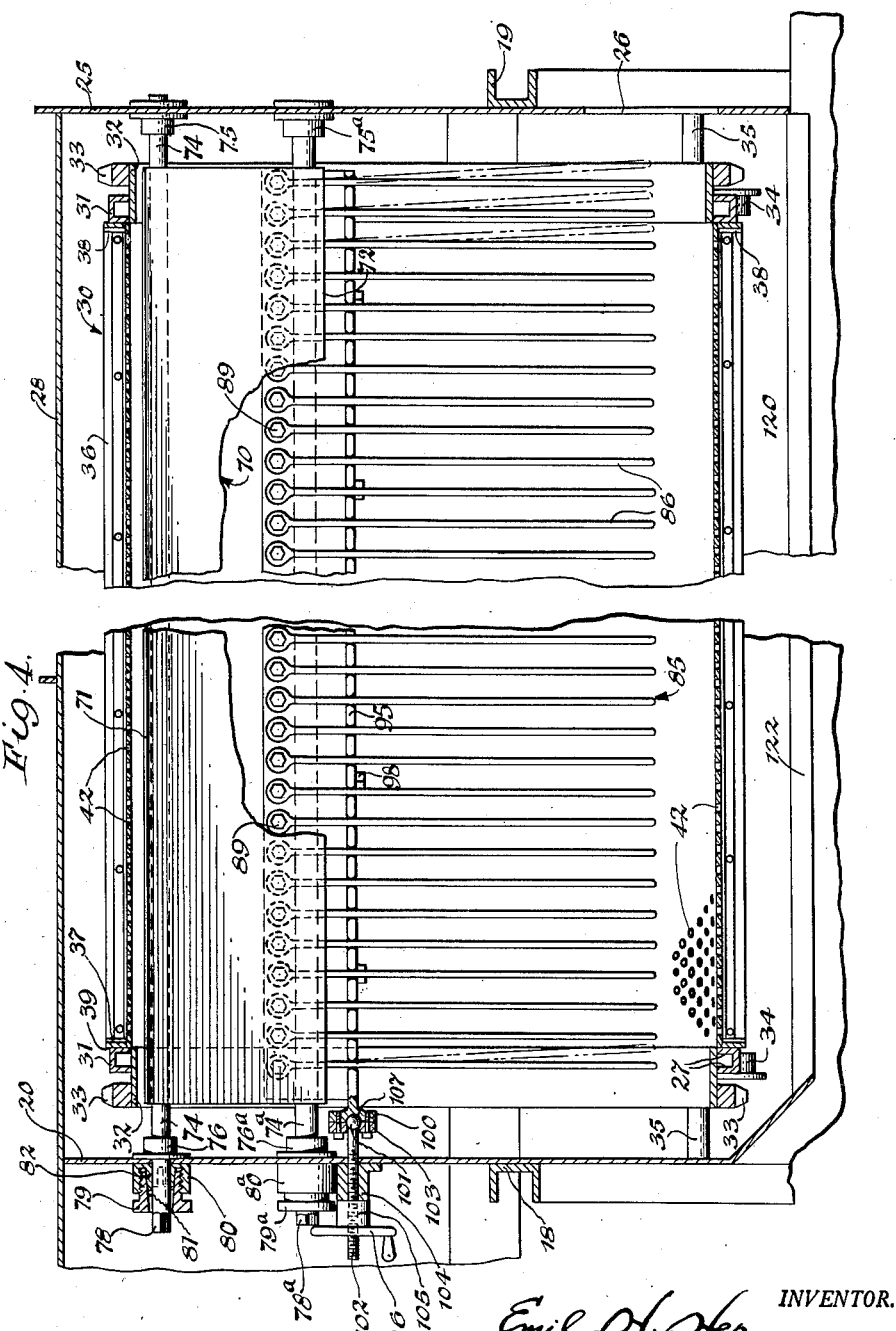

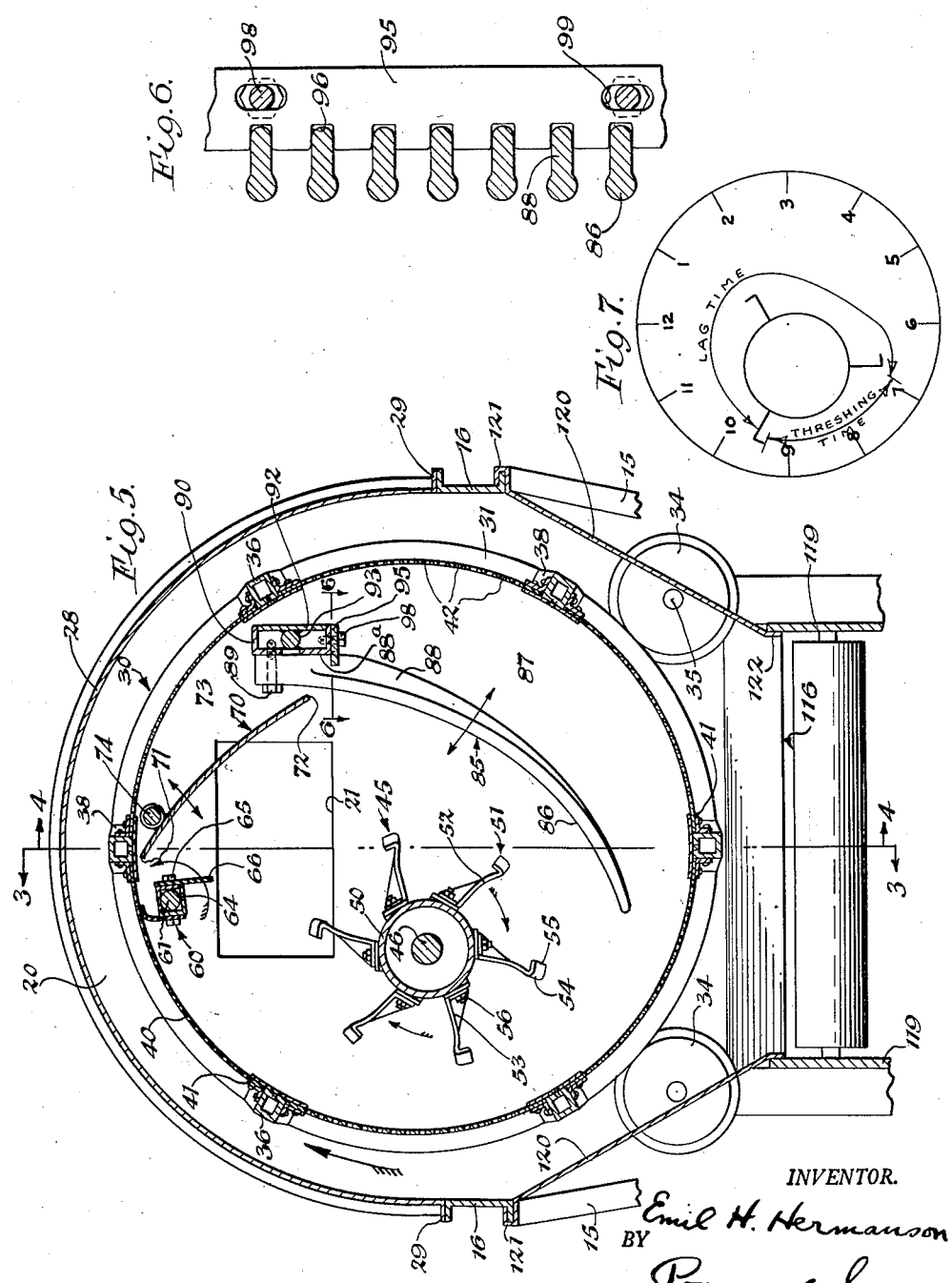

United States Patent Office 2,768,628
Patented Oct. 30, 1956

2,768,628

VINER

Emil H. Hermanson, Niagara Falls, N. Y., assignor to Chisholm-Ryder Co., Inc., Niagara Falls, N. Y., a corporation of New York Application November 22, 1954, Serial No. 470,274

6 Claims. (Cl. 130—30)

This invention relates to threshers such as are used to thresh green peas and lima beans for commercial packing and more particularly to that type of thresher having a slowly rotating reel and rotary beater arranged within the reel, the material to be threshed being conveyed through the reel and the peas or beans threshed out by the beater falling through perforations in the reel. The thresher can be in the form of a viner in which the pods are attached to the vines or can be used to thresh pods which have previously been separated from the vines.

In threshers of the general class to which this invention relates, the principle of impact is employed to remove the peas or lima beans from the pods, the pods containing more or less air as well as the peas or beans. The impact causes distortion and produces a pressure within the pod that causes it to burst at its weakest point where the two halves are joined.

In operation as a viner, the vines, with their pods, are dropped onto an automatic feeder which feeds them into the reel of the viner, this reel having its peripheral surface in the form of a perforated screen or the like which permits the threshed peas to fall from the reel. A beater assembly is arranged within the reel and is rotated at a comparatively high speed to cause the opening of the pods by impact. The vines are conveyed through the reel and by the time the vines reach the discharge end of the reel substantially all of the pods have been opened. The separated peas or lima beans fall through the perforations in the reel onto a conveyor means arranged below the reel, and chaff or trash is usually separated from the peas or lima beans being discharged by this last conveyor.

One of the principal objects of this invention is to provide such a thresher of increased capacity and which at the same time requires reduced power to rotate the reel and beater assembly.

Another object of the invention is to provide such a thresher which is of improved efficiency both in the recovery of the maximum amount of peas or beans from the vines or pods and also in the recovery of these peas or lima beans in whole form instead of splits, and with a minimum of bruising.

Another object of the invention is to provide such a thresher in which the reel can be rotated at a slower speed so as to facilitate the discharge of the threshed peas or lima beans through the perforations of the reel and in which the capacity of the thresher is not reduced by this relatively low speed. In threshers, particularly viners, as heretofore used commercially, the speed of rotation of the reel was directly related to the speed of conveying the vines or pods through the reel and hence a relatively high reel speed was required to obtain the desired capacity.

Another object of the invention is to provide such a thresher in which, following impact of the beaters, the vines are spread out to permit the escape of the threshed peas or beans in whole form but following which the vines are quickly returned to the beaters. By this the vines are subjected to the maximum beating action in their course through the reel and the time in which their not being beaten is reduced to a minimum while at the same time adequate provision is made for the escape of the threshed peas or beans.

Another object is to provide such maximum beating time and minimum non-beating time by baffles or members which block off a part of the interior of the reel to accomplish the rapid return of the vines to the beater and in which these baffles or members are so arranged as to permit the ready escape of the threshed peas or beans and also to adjust the rate of movement of the vines through the reel.

Another object of the invention is to provide such a thresher in which the usual lifting ribs inside of the reel are entirely eliminated. Such lifting ribs have the undesirable effect of causing the vines in a viner to be gathered and threshed in independent masses; result in unnecessary violence in the threshing which causes a relatively high percentage of splits and damaged peas or beans; interfere with the free escape of the threshed peas or lima beans through the perforations of the reel; and result in an increased power consumption in the rotation of both the beaters and the reel.

Another important object is to provide a viner having a metal screen through which the peas escape from the mass of vines. Heretofore rubber screens have been required in viners because the flexibility of the rubber was necessary to reject the dirt and debris which would rapidly blind a relatively inflexible metal screen.

Another object of the invention is to provide such a thresher in which the reel is positively cleaned by flails employed for the purpose of cleaning the reel and in which these flails also contribute to the maximum yield of threshed peas or lima beans both through their own flailing action and also in preventing bunching of the vines or pods so that threshed peas are free to fall through loose vines to the reel and are not carried on or trapped in the vines or pods.

Another object of the invention is to provide a viner in which the time of passage of the vines from the threshing zone back to the threshing zone can be readily varied to suit the particular vines being threshed.

Another object is to provide such a viner in which the reel is in the form of a simple perforated cylinder and which in particular is free from internal rings or annular ribs which would form a series of inwardly opening pockets within the reel.

Another object of the invention is to provide such a thresher which is very compact, and more particularly is of such small size as to be capable of being mounted on a mobile, preferably self-propelled, chassis so that the peas or lima beans can be threshed in the field directly from freshly cut vines by moving the viner along the rows and by having mobile harvesting equipment for either cutting the vines or removing the pods and immediately delivering them to the inlet of the thresher. This is in contrast to the present necessity of cutting the vines and loading them on trucks for transportation to the cannery where the vines have to be unloaded from the trucks and fed to the viner and which is also subject to very important disadvantage that the vines are piled up at the cannery to ferment with a noxious odor and to require removal whereas in the field the vines can readily be plowed back into the earth and in any event are spread out so as to dry rather than ferment. Also an important consideration affecting the quality of the product is the speed with which the peas on the growing vines can be placed in cans. With a mobile thresher it is obvious that the threshed peas can be transported to the cannery much more quickly than is possible where all of the vines are required to be brought to the cannery.

Another object is to provide a thresher many parts of which can be made of light weight metals such as aluminum.

Another important object of the invention is to facilitate the escape of threshed peas or lima beans from the reel of the thresher, thereby to avoid unnecessary beating action on such threshed peas and lima beans and to provide a higher quality product.

Another object of the invention is to provide such a thresher which can be made of extremely simple and inexpensive form so that the threshers can be sold at a lower cost.

Another purpose is to provide such a thresher which will stand up under conditions of severe and constant use without getting out of order or requiring repairs.

Other objects and advantages of the invention will be apparent from the following description and drawings in which:

Fig. 1 is a diminutive side elevational view of a thresher embodying the present invention and mounted on the rear end of an automotive chassis, with parts broken away to disclose features of the invention.

Fig. 2 is a rear elevational view thereof.

Fig. 3 is a fragmentary vertical longitudinal section through the viner, this section being taken on line 3—3, Fig. 5 and looking to the left.

Fig. 4 is a fragmentary vertical longitudinal section taken generally on line 4—4, Fig. 5 and looking to the right.

Fig. 5 is an enlarged fragmentary transverse section taken generally on line 5—5, Fig. 1.

Fig. 6 is a generally enlarged fragmentary horizontal sectional view taken on line 6—6, Fig. 5.

Fig. 7 is a chart of a cycle of one rotation of the vines in the viner showing the general path of the vines, as well as the zone in which threshing action occurs and the zone of "lag time" during which the peas or lima beans separate from the vines.

Fig. 8 is a fragmentary enlarged section through the outer reinforcing flange of a beater plate and showing the manner in which pins are mounted in these flanges to render the beaters more effective.

The viner forming the subject of the present invention is particularly intended for use in the field where the peas or lima beans are grown, the viner being propelled along the rows while the vines or pods are cut and fed to the viner, the threshed vines or pods being thrown back to the ground where they can be plowed back into the soil. The threshed peas or lima beans can be then transported at frequent intervals to the canneries so that they can be packed with maximum freshness.

To provide this mobility in the viner, the frame 10 of the viner is shown as mounted on the rear end of the chassis 11 of an automotive truck having rubber tired supported wheels 12.

The viner frame 10 is shown as having a base composed of longitudinal side pairs or rails 13 connected by cross bars 14 and from this base risers 15 extend upwardly to support a longitudinal rectangular frame composed of side channels 16 which are connected at their rear ends by a cross channel 18 and at their front ends by a cross channel 19. A transverse metal plate 20 forms the rear end head of the machine and is shown as having its upper part of semicircular outline and as being arranged against the inner face of the cross bar 18. This rear end head or plate of the viner is shown as having in its upper part an inlet opening 21 through which the vines to be threshed are fed by a feeder (not shown) below which cross bar 18 the side edges 22 of the rear end head 20 converge downwardly toward each other as best shown in Figs. 2 and 5. The forward end head 25 of the viner is preferably generally similar in outline to the rear end head 20 and composed of a plate which is disposed against the inner face of the forward cross bar 19. This forward end head 25 is, however, provided in its lower part with an outlet opening 26 through which the threshed vines are discharged on to any type of straw carrier (not shown).

The upper semicircular edges of these metal plates or end heads 20 and 25 are shown as connected by a semicircular hood 28 which is shown as being made of metal in three sections and as resting at their lower flanged edges 29 (Fig. 5) on the longitudinal side frame pairs 16. The hood 28 is preferably readily removable for access to the moving parts of the viner, but since this forms not a part of the present invention, the details of the hood 28 and its mounting are not illustrated.

The reel through which the vines to be threshed are conveyed is indicated generally at 30. The reel is shown as including a pair of end rings 31 of U-shape in cross section with their flanges projecting inwardly. These flanges are secured as by welding 27 to a cylindrical ring 32. These cylindrical rings project axially outwardly beyond the end rings 31. A ring gear 33 is mounted on the outer extremity of each of the cylindrical rings 31, each ring gear 33 preferably being in spaced relation to the corresponding end ring 31, so as to provide space for the flanges of flanged supported rollers 34. Each of the end rings 31 is supported on two of such flanged rollers 34 and each of these rollers is shown as being rotatably mounted on a stub shaft 35 which is suitably supported from the viner frame.

The end rings 31 are shown as being connected by six parallel external bars 36 which are shown as being of square tubular form in cross section as best shown in Fig. 5. Each end of each of these bars is secured as by welding 37 to a small end plate 38 and these end plates are in turn secured as by welding 39 to the opposing vertical faces of the end rings 31.

The reel is completed by segmental plates 40. Each of these segmental plates fills the space between a corresponding pair of longitudinal bars 36 and is provided along its longitudinal edges with angle irons 41 which provide flanges for securing the segmental plates 40 against the sides of the longitudinal bars 36. Each of the segmental plates 40 of the reel is perforated, as indicated at 42, throughout its entire area, these holes being of the size to permit the ready escape of peas or lima beans being threshed.

The use of the perforated metal plates 40 as the shell or screen of the reel, while not essential to the operation of the viner, is an important feature of the viner. Heretofore metal screens have not been practicable in viners because they are stiff and tend to collect dirt and debris which quickly blinds the perforations. Accordingly rubber screens have been required for viners because the flexibility of rubber screens causes them to flex and reject the dirt and debris and to prevent blinding. Metal screens have obvious advantages over rubber such as in cost and ease of securing the screens as well as their contribution to the structural strength of the reel. With the present viner such metal screens can be used because of the flails of the screen cleaners which are employed, as hereafter described, and which constantly sweep away any dirt or debris tending to collect on the metal screens and blind their openings.

The reel 30 can be rotated by chains (not shown) passing around the ring gears 33 and which can be driven from suitable sprockets, the particular gearing forming no part of the present invention and hence not being illustrated. The reel is rotated in a clockwise direction as viewed in Fig. 5.

The vines to be tthreshed are fed into the reel 30 through the inlet opening 21 in the end head or plate 20 and are discharged from the reel through the outlet opening 26 in the opposite end head on plate 25 of the viner. The vines are conveyed through the reel 30 by a rotary beater mechanism which operates in conjunction with stationary members within the reel and also in conjunction with the flail cleaners to convey the vines, thresh the pods and separate the threshed peas or lima beans.

This beater mechanism, indicated generally at 45, is supported and driven by a shaft 46, one end of which is journalled in a bearing 48 carried by the frame cross bar 18 at the inlet end of the viner and the other end of which is journalled in a bearing 49 carried by the frame cross bar 19 at the discharge end of the viner. The shaft 46 is rotated clockwise, as shown in Fig. 5, and carries a cylinder 50 which rotates therewith. The shaft 46 of this beater cylinder is mounted generally in the same horizontal plane as the axis of the reel 30, but the beater shaft 46 is arranged substantially to one side of the axis of the reel, as best shown in Fig. 5, so that the beater mechanism is eccentrically disposed with reference to the axis of the reel and is arranged close to the rising side of the reel and remote from the descending side of the reel, this forming an important feature of the present invention. Thus it will be seen that the reel and beater mechanism are so positioned with reference to each other as to provide a zone of closest approach at the left hand side of the reel as viewed in Fig. 5, with the rising sides of the reel and beater mechanism being arranged in close proximity to each other.

The beater cylinder 50 carries a plurality of beaters 51 which are preferably of identical construction. Each of these beaters is preferably in the form of a sheet metal plate 52 secured against the flat face of a corresponding bracket 53 in any suitable manner. The outer end of each of the sheet metal beater plates 52 preferably curves forwardly to provide a leading nose 54 from which the beater plate is bent in a reverse direction to provide a reinforcing flange 55. Each bracket 53 is shown as being adjustably secured, as by a bolt 56, to the beater cylinder 50 so that each beater plate 52 projects generally radially outwardly from the beater cylinder 50. These bolts 56 permit the beater plates 52 to be angularly adjusted with reference to the axis of the beater cylinder. This adjustability is not, however, essential since the rate of movement of the vines through the reel 30 is determined by stationary members as hereinafter described. The beater plates 52 serve both to thresh the vines and also to convey the vines through the reel 30 and to this end the beaters are set at such angle about the axes of the bolts 56 so as to obtain generally the desired rate of flow of the material through the viner.

The viner also includes a rotary cleaning device, indicated generally at 60, to keep the reel 30 clean both by keeping its perforations 42 from blinding and by keeping the mass of vines in suspension. This rotary cleaner comprises a shaft 61 which is journalled at its ends in bearings 62 each at the upper end of a gooseneck bracket 63. The bases of these gooseneck brackets 63 are mounted on the cross bars 18 and 19, the purpose of the gooseneck form of these brackets being to avoid obstruction of the inlet opening 21, as best shown in Fig. 2. These brackets support the shaft 61 so that it extends inside the reel 30, cross to the highest point or crest of this wheel as best shown in Fig. 5 and within the reel 30 the shaft 61 is encased by a square tubular shaft 64, this tubular shaft being fixed to the shaft 61. To opposite faces of the tubular shaft 64 are removably secured, as by bolts 65, a pair of flails 66. Preferably these flails are made of rubber and, as best shown in Fig. 3, are in the form of rubber strips extending the full length of the reel 30 one side of each of these rubber strips or flails 66 projecting tangentially from the shafts 61, 64 sufficiently far to engage and be distorted or bent by the inner surface of the reel. The rotary cleaner 60 is rotated in a counterclockwise direction as viewed in Fig. 5 and serves not only to sweep the internal surfaces of the perforated plates 40 and keep their perforations 42 from blinding but also serves to deflect any vines thrown into its orbit by the beaters 51 horizontally toward a deflector plate 70.

This deflector plate 70 is in the form of a generally rectangular metal plate extending internally the full length of the reel and having its upper edge 71 arranged at the crest or 12:00 position of the reel while its lower edge 72 is arranged at about the 2:00 position of the reel but spaced a substantial distance toward the axis of the reel. By this arrangement, it will be seen that the upper edge 71 is arranged just outside of the orbit or zone of action of the flails 66 and that a substantial space 73 within the reel 30 is blanked out or rendered inoperative so far as the movement of the vines is concerned. This deflector plate 70 is fast to a horizontal rod 74 which is disposed within the reel 30 near the crest thereof in about the same horizontal plane as the beater shaft 61. One end of this rod 74 is journalled in a bearing 75 suitably carried by the end head or plate 25 and the other end is suitably journalled in a bearing 76 carried by the other end head or plate 20. The shaft 74 projects outwardly from the end head 20 and is provided with a squared end 78 so that a wrench can be applied to turn the rod 74 and thereby adjust the angularity of the baffle or deflector plate 70. The adjustment of this plate and rod can be set by tightening a screw 79 fitted in an internally threaded cup 80 and this screw having a conical bore 81 which embraces the rod 74 and engages conical fingers 82 which are preferably integral with the cup 80. The cup 80 is mounted on the end head or plate 20 and hence it will be seen that by tightening the screw 79, the conical fingers 82 will be tightened against the rod 74 so as to hold it immobile with respect to the viner frame.

The plate 70 deflects the vines against a series of curved or tusk-shaped bars 85 arranged in the reel, the upper ends of these bars being disposed at about the 2:00 position of the reel as viewed in Fig. 5 while their lower ends are arranged at about the 6:30 o'clock position as viewed in Fig. 5, although this latter position is adjustable. These tusk-shaped bars accordingly provide a space 87 of substantial extent from which the vines are isolated but into which the threshed peas or lima beans are free to enter and escape through the reel perforations 42 without interference from vines. This feature of isolation of the descending side of the reel 30 by the presence of the baffle plate 20 (forming the blocked off chamber 73) and the arms 85 (forming the blocked off chamber 87) is a most important feature of the present invention.

Each of these bars 85 is preferably in the form of a casting having an enlarged rounding nose 86, along its concave edge which opposes the beater mechanism 45, rotary cleaning mechanism 60 and baffle 70 and a reinforcing rib or flange 88 extending along its convex side. The upper end of each bar is enlarged to receive a horizontal screw 89 and this enlargement is provided with a flat face 88a disposed against the web of a structural steel channel 90, each screw 89 screwing into this web of the channel 90 but preferably mounting the bars 85 so that they are free to swing about the axes of the screws 89. The channel 90 extends the full length of the reel 30 and carries the bars 85 as a closely spaced suspended series also extending the full length of the reel 30.

The channel 90 preferably has a plate 92 welded between the edges of its flanges so as to provide an open-ended box structure and in this box structure is welded a rod 74a. As with the rod 74, one end is journalled in a bearing 75a carried by the end head or plate 25 while its opposite end is journalled in a bearing 76a carried by the end head or plate 20. Also, as with the shaft 74, one end of the shaft 74a projects outwardly from the plate or end head 20 and is squared as is 78a to receive a wrench. Also, a screw 79a similar to the screw 79 screws into a cup 80a fast to the end head 20 and edge fingers (not shown) similar to the fingers 82 grip against the rod 74a to hold it in any angular position. Since the shaft 74a and its mounting is identical to the shaft 74 and its mounting, this description is not repeated in detail.

A feature of the invention resides in the provision of means for adjustably swinging the entire series of pendent bars 85 to different angular positions about their supporting screws 89. This purpose of this adjustment is to vary the rate of movement of the vines through the reel 30. Thus, by having these bars 85 perfectly vertical, they neither add to nor subtract from the action of the beaters 51 in conveying the vines through reel. By swinging these bars 85 to the dot-dash line shown in Fig. 4, it will be seen that they tend to direct the falling vines toward the inlet end of the viner and hence tend to retard the movement of the vines through the viner. By swinging these bars 85 to the extreme left, as viewed in Fig. 4, these bars are arranged so as to accelerate or add to the propelling effect of the beaters 51. It will therefore be seen that by adjusting these bars, a substantial adjustment can be made in the rate of movement of the vines through the viner, this rate being determined by a number of factors particularly by the degree to which the beater vines being threshed resist the threshing action.

To permit of adjustably altering and fixing this angularity of these bars 85, an adjusting plate 95 is arranged across the under side of the lower flange of the channel 90 and is provided with a plurality of equally spaced notches 96 each receiving a reinforcing web 88 of one of the bars 85. The plate 95 is slidable lengthwise of the channel 90 and for this purpose is supported by screws 98 which anchor in the lower flange of the channel 90 and extend lengthwise through slots 99 in the bar 95, so that the bar 95 can move lengthwise a distance equal to the length of these slots. Any arrangement can be provided to permit longitudinal adjustment of the bar 95, that shown comprising a head 100 provided at one end of the bar 95 and having a socket 107 adapted to receive a ball 101 at the end of a threaded shaft 102. The ball is held against the head 100 by a cap 103 and the threaded shaft 102 extends through the unthreaded bore of a bearing 104. A nut 105, having a crank 106, is threaded on the end of the shaft 102 and by turning this crank and nut, the shaft 102 is moved longitudinally thereby to effect a corresponding longitudinal movement of the bar 95 and a corresponding angular adjustment of the entire series of bars 85 as illustrated by the full and broken lines in Fig. 4.

It has been found that in the threshing of pea vines, the beaters 51 were not fully effective and that their effectiveness in handling the vines was greatly increased by the provision of short pins 110 extending through the flanges 55 of the beater. As best shown in Fig. 8, these pins are relatively small preferably being in the order of about ½" diameter and about 1¼" in length. Each pin is provided with a threaded stem 111 which extends through its flange 55 and is held to this flange by a lock nut 112.

Preferably, each of these pins 110 moves in its own individual circular path and for this reason, these pins in any one beater 51 at, say, the extreme right hand end as viewed in Fig. 3 are offset with reference to pins in companion beaters. Also, these beaters have been found to be of less importance toward the outlet end of the beater and hence provided in large number in the first series of three beaters at the extreme right hand of the viner as viewed in Fig. 5, the succeeding annular series of beaters progressively carrying fewer of these pins and the beaters in the last, say, third of the viner carrying no pins at all.

The peas or lima beans threshed from their pods, primarily by the beater mechanism 45 and to a lesser degree by the rotary cleaner 60, escape from the rotating reel 30 through the perforations 42 thereof. These peas or lima beans fall into the upper stretch 115 of a horizontal endless conveyer belt 116 which is mounted on rollers 118. These rollers extend transversely of the viner and are journalled in the side boards 119 which form part of the frame of the viner. The upper stretch 115 of this belt is shown as moving toward the outlet end of the viner and can discharge the peas or lima beans into a blower device (not shown) for removing leaves and trash from the peas or lima beans. The endless conveyer belt 116 is preferably narrower than the reel 30 and peas or lima beans falling from the sides of the reel are deflected onto the upper stretch of this endless belt by inclined side plates or curtains 120 which are preferably made of metal. Each of these side curtains or plates is preferably channelled along its upper edge, as illustrated at 121, to fit around the lower flange of the corresponding main longitudinal side frame bar 16 and is also preferably flanged, as shown at 122, to rest against the inner face of the corresponding side board 119 of the endless conveyor belt 116. These metal side curtains are thereby readily removable for cleaning the internal mechanism of the viner.

It will be seen that essentially the present invention is directed to an improvement in a thresher having a frame, a foraminous reel mounted on the frame to rotate about a generally horizontal axis and adapted to receive and convey the material to be threshed from one end thereof to the other, a rotary beater mechanism arranged in this reel to rotate about an axis generally parallel with the axis of the reel and including a plurality of outwardly projecting beaters, this axis of the beater mechanism being arranged eccentric, in a horizontal direction toward the rising side of the reel, to the axis of said reel a substantial distance, and the reel and beater mechanism being rotated in the same angular direction to provide a zone of closest approach between the rising sides of the reel and beater mechanism and a space of substantial extent between the descending sides of said reel and beater mechanism. The invention of the present application is directed to the combination with such a thresher of means for facilitating movement of the material being threshed from this zone of closest approach, through the space of susbtantial extent and back to this zone of closest approach and comprising a baffle means secured to the frame to be substantially stationary with respect to the reel and arranged in this space of substantial extent to extend lengthwise of said reel and interposed between the beater mechanism and the descending side of the reel so as substantially to isolate the materials from the descending side of the reel and to shorten the path of the materials through this space of substantial extent. An important feature is that the baffle means, as exemplified by the baffle plate 70 and the pendent bars 88,, are provided with a multiplicity of openings, such as the spaces between the bars 85, so that the threshed peas or lima beans can freely escape to the blanked off space 87 along the descending side of the reel and escape through the perforations 42 without interference. Further subordinate features reside in the features of adjustability of the baffle means; their particular form and location; and the relation to the screen cleaner 60 to the baffle means. Another feature of the invention, useful in threshing peas from vines, is the provision of the pins 111 on certain of the beaters 51 and preferably provided in progressively greater number toward the inlet end of the reel where these pins are particularly effective.

*Operation*

In the operation of the viner, the harvested vines with the pods attached are fed through the inlet opening 21 into the reel 30. This reel, rotatably supported upon the four rollers 34, is rotated in a clockwise direction, as viewed in Fig. 5, and the beater mechanism 45 is likewise rotated in a clockwise direction, as viewed in this figure, but at a much higher speed. The rotary cleaner 60 is rotated in a counterclockwise direction as viewed in Fig. 5.

The beater plates 51 are all set at a pitch which conveys the vines lengthwise of the reel 30 to the discharge end thereof.

The vines so fed in through the inlet opening 21 into the reel 30 fall to the bottom of this reel and since this reel is rotating clockwise, as viewed in Fig. 5, these vines would be carried up to about an 8 o'clock position before beginning to tumble backwards. In this position, however, the vines are in the center of the zone of operation of the beaters 51 of the beater mechanism 45, and since the beater mechanism is being rotated at a relatively high rate of speed, these beaters strike the vines vigorously and also knock the vines against the inside of the reel. The threshing action of the beaters, as illustrated diagrammatically in Fig. 7, commences at about the 7 o'clock position and continues to about the 9:30 o'clock position within the reel 30. Since the beaters 51 and the reel 30 are both moving upwardly at the side of the viner under consideration, the vines are drawn upwardly through the space or zone of closest approach of the beaters 51 and the reel 30, this being at about the 8:30 o'clock position, as viewed in Fig. 5. Since the beaters 51 are rotating at a much higher speed, the action of the beaters tends to tear the mass of vines apart on drawing the vines through this restricted space or zone, thereby to expose a large number of the pods to the direct action of the beaters which results in a large number of the pods being opened and the peas or lima beans released. This tearing apart action, with pea vines, is greatly accelerated by the small pins 111 provided on the beaters 5, preferably in greater number toward the inlet end of the beater.

In the continued upward movement of both the side of the reel 30 and the beaters 51 above their zone of closest approach, the rapidly rotating beater tends to hold the vines against the inner surface of the reel. Since the space between the rotating beaters 51 and the reel 30 gradually widens out above the 8:30 o'clock position, the vines tend to separate and change their position with reference to one another so that the pods which were not previously exposed are brought into the zone of operation of the beaters 45. The vines are held against the reel until they have reached approximately the 10 o'clock position. They then fall downwardly directly into the zone of operation of the beaters 51 and are struck by the beaters and thrown upwardly and laterally to the right, as viewed in Fig. 5, toward the rotary cleaner 60 and also the adjustable baffle plate 70.

A part of these vines encounter the flails 66 of the rotary cleaner 60 and since these flails are rotating in a clockwise direction, as viewed in Fig. 5, these vines are deflected against the baffle plate 70. These flails act upon the sides of the vines opposite from the sides acted upon by the beaters 51 and break open such pods as they strike. These flails also tend to tear apart any bunches of vines so that the vines are moved toward the baffle plate 70 as a loose mass from which threshed peas or lima beans can readily escape and which is in a spread apart condition to be again effectively acted upon by the beater mechanism 45. It will be particularly noted that these flails 66 tend to accelerate the movement of the vines and reduce the so-called "lag-time," this being the period during which there is substantially no threshing of the vines but during which time the threshed peas or lima beans fall from the vines.

The vines are deflected by the plate 70 downwardly against the curved bars 85. Since these bars are widely spaced, it will be seen that the threshed peas or lima beans readily pass through these bars into the space or zone 87 at the right hand side of these bars, as viewed in Fig. 5, and that in this space the peas or lima beans are isolated from the vines and hence can freely bounce around or dance on the bottom of the reel 30 and quickly escape through the perforations 42 thereof. It will also be seen that the presence of the baffle plate 70 and the bars 85 provide the spaces 73 and 87 from which the vines are withheld thereby to cut down the so-called "lag-time" and forcing the vines to traverse a shortened path back to the constricted threshing zone of the beaters 51.

Since the beaters 51 are placed at an angle to the axis of the beater shaft 46, the throwing of the vines when they fall from the 10:00 o'clock position to the zone of action of the beaters is slightly toward the discharge end of the viner. The vines are therefore progressively acted upon by the many beaters as they traverse the length of the reel. The threshed vines are passed out through the outlet opening 26 to be received by the usual straw carrier (not shown).

It is desirable to be able to adjust the rate of flow of the vines through the viner depending upon the character of the particular vines being threshed. To accelerate the flow of vines through the viner all that is necessary is for the operator to turn the hand wheel 106 in the direction to swing the bars 85 toward the left as viewed in Fig. 4. This adjusting action is transmitted by the longitudinal movement of the screw 102 which draws the toothed plate 95 to the left as viewed in Fig. 4 thereby to swing the lower ends of the bars 85 toward the discharge end of the machine so that these bars have a propelling action upon the vines. As previously indicated, the major movement of the vines is a function of the angularity of the beater plates 51, but the adjustment of the degree of effectiveness of these beater plates can readily be effected, in the practice of the present invention, by this adjustment of the several bars 85.

The threshed peas or lima beans fall through the perforations 42 of the segmental metal plates 40 which form the shell of the reel 30. Such peas or lima beans as fall through the bottom of the reel 30 fall directly upon the uper stretch 115 of the endless conveyor belt 116. Such peas or lima beans as fall from the sides of the reel 30 fall onto the inclined metal side curtains 120 which deflect them onto the upper stretch of the endless conveyor 116. This upper stretch is shown as moving horizontally toward the outlet end of the viner and can discharge the threshed peas or beans into a blower mechanism (not shown) which operates to separate the trash and chaff from the threshed peas or lima beans.

The flails 66 which rapidly beat the inner faces of the segmental plates 40 tend, of course, to keep these plates clean and to keep their perforations 42 open.

As previously indicated, the viner operates with increased efficiency and capacity and with decreased power consumption, and is smaller in size, as compared with viners of this type as now commercially used and in which the beater cylinder is arranged coaxially of the reel and in which the lifting of the vines into the zone of action of the beaters is effected by longitudinal lifting ribs provided in the reel. In such viners as are now in use the vines are elevated by the lifting ribs and dropped from an elevated position into the zone of action of the beaters which open the pods. With such lifting ribs, it is apparent that slowing down of the reel reduces the capacity of the viner inasmuch as the quantity of the vines elevated and dropped into the zone of action of the beaters in any given period of time will be proportionately reduced with the reduction in speed of the reel. A low speed rotation of the reel is desirable since with a lower speed the threshed or loose peas have a better chance to escape quickly through the holes in the screen wall of the reel. However, with reels as heretofore constructed with such internal lifting ribs, such reduction of speed could only be effected at a sacrifice in the capacity of the viner. With the present viner the reel 30 can be rotated at a much slower speed as compared with conventional viners and the loose peas are given increased time to escape through the perforations 42 of the reel segments 40 inasmuch as the speed of rotation of the reel has no substantial relation to the capacity or speed with which the vines are conveyed axially through the reel, this axial movement of the vines being determined by the pitch or setting of the beaters 51 as corrected by the position or setting of the curved bars 85.

The elimination of the lifting ribs further greatly reduces bunching of the vines into separate masses, particularly dense and angled masses which tend to trap large quantities of peas or lima beans. In addition to providing a slower reel speed and hence facilitating the immediate escape of the threshed peas or lima beans, the vines in the present viner are threshed as a continuous spread out or pulled apart mass which is constantly shifting internally and which rotates with the reel and moves axially toward the discharge end of the viner. This mass is progressively brought into and out of the zone of action of the beaters 51 and is torn apart at the point of closest approach of the beaters so as to secure an internal movement of the mass of vines which rapidly brings the pods into the zone of action of the beaters. In contrast, with viners having internal lifting ribs, the vines were necessarily treated in separate masses or bunches, which tend to compact themselves, the lifting ribs forming and picking up the vines as separate masses or bunches and dropping these bunches into the zone of action of the beaters. The vines and pods trapped in the center of these separate bunches or masses were very often unable to escape and hence such pods were carried through to the discharge end of the machine without being threshed. Substantial percentages of peas or lima beans, trapped in the bunches, were carried out with the straw and in any event such trapped threshed peas or lima means were subjected to unnecessary beating action and bruising. By actual operation, the viner embodying the present invention operates with greatly improved efficiency and capacity in threshing peas or lima beans as compared with the lifting rib type of viners. Further, the fact that there are no protruding longitudinal ribs in the reel of the present invention eliminates the shock of vine masses being crushed by the beaters and the ribs, this resulting in a decrease in the power required to rotate the beater mechanism of the reel and also in a decrease of split peas and unopened pods pulled from the vines.

With peas, the pins 110 have also been found particularly effective, particularly when they are in greater number toward the inlet end of the viner, in separating the vines into loose form and maintaining the vines in such loose condition during the threshing operation.

From the foregoing, it will be seen that the present invention provides a thresher which operates with increased efficiency and capacity and with lower power consumption to thresh peas or lima beans from pods attached to or detached from vines, with reduced bruising of the lima beans or peas, and is of compact and inexpensive construction and will stand up under conditions of severe and constant use without getting out of order or requiring repairs.

I claim:

1. A thresher of the character described comprising a frame, a foraminous reel mounted on said frame to rotate about a generally horiozntal axis and adapted to receive and convey the material to be threshed from one end thereof to the other, a rotary beater mechanism arranged in said reel to rotate about an axis generally parallel with the axis of said reel and including a plurality of outwardly projecting beaters, said axis of said beater mechanism being arranged a substantial distance eccentric in a horizontal direction toward the rising side of said reel to the axis of said reel, means arranged to rotate said reel and beater mechanism in the same angular direction to provide a zone of closest approach between the rising sides of said reel and beater mechanism and a space of substantially greater extent between the descending sides of said reel and beater mechanism, baffle means secured to said frame to be substantially stationary with respect to said reel and arranged in said space of substantially greater extent to extend lengthwise of said reel and interposed between the descending side of said beater mechanism and the descending side of the reel thereby substantially to isolate said materials from said descending side of said reel and to shorten the path of said materials through said zone of substantial extent.

2. The combination set forth in claim 1 wherein a rotary reel cleaner is rotatably mounted in said space of substantial extent adjacent the upper extremity of said baffle means and on the side thereof adjacent said beater mechanism, said rotary cleaner rotating about an axis generally parallel with the axis of said reel and including flails engaging the inside of said reel and the upper sides of said materials passing thereunder toward said baffle means.

3. The combination set forth in claim 2 wherein the flails at the bottom of the rotary reel cleaner move said materials passing thereunder toward said baffle means.

4. The combination set forth in claim 2 wherein said baffle means includes a plate extending substantially the full length of said reel and are pivotally connected to said frame along an axis arranged close to said rotary reel cleaner and also close to the upper edge of said plate and wherein adjustment means are provided for fixing said plate in different positions of adjustment about its axis.

5. The combination set forth in claim 4 wherein said baffle means also include a series of spaced vertical bars against which the material to be threshed is directed by said baffle plate.

6. The combination set forth in claim 1 wherein said outwardly projecting beaters are each in the form of radially projecting plates and wherein pins are mounted to project from the outer ends of said plates.

References Cited in the file of this patent

UNITED STATES PATENTS

| | | |
|---|---|---|
| 228,310 | Brubaker | June 1, 1880 |
| 418,361 | White | Dec. 31, 1889 |
| 938,139 | Gotshall | Oct. 26, 1909 |
| 2,667,905 | Tanner | Feb. 2, 1954 |